United States Patent
Tang et al.

(10) Patent No.: US 8,837,772 B2
(45) Date of Patent: Sep. 16, 2014

(54) IMAGE DETECTING METHOD AND SYSTEM THEREOF

(75) Inventors: Tsann-Tay Tang, Taipei (TW); Chih-Wei Lin, Hsinchu (TW); Ming-Yu Shih, Gueishan Township, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 1107 days.

(21) Appl. No.: 12/468,224

(22) Filed: May 19, 2009

(65) Prior Publication Data

US 2010/0098292 A1 Apr. 22, 2010

(30) Foreign Application Priority Data

Oct. 22, 2008 (TW) .............................. 97140546 A

(51) Int. Cl.
*G06K 9/00* (2006.01)

(52) U.S. Cl.
USPC ........... 382/103; 382/104; 382/181; 382/199; 348/169; 348/148

(58) Field of Classification Search
USPC ................. 382/103, 171, 178, 199, 181, 202; 348/148, 154, 155, 169
See application file for complete search history.

(56) References Cited

U.S. PATENT DOCUMENTS

| | | | |
|---|---|---|---|
| 5,210,799 A * | 5/1993 | Rao | 382/103 |
| 5,434,927 A | 7/1995 | Brady et al. | |
| 5,487,116 A | 1/1996 | Nakano et al. | |
| 5,974,175 A * | 10/1999 | Suzuki | 382/199 |
| 6,477,260 B1 * | 11/2002 | Shimomura | 382/106 |
| 6,480,615 B1 * | 11/2002 | Sun et al. | 382/103 |
| 6,625,300 B1 * | 9/2003 | Kyo | 382/104 |
| 6,628,804 B1 * | 9/2003 | Edanami | 382/107 |
| 6,792,147 B1 * | 9/2004 | Saka et al. | 382/199 |
| 6,842,531 B2 | 1/2005 | Ohtsuka et al. | |
| 7,561,720 B2 * | 7/2009 | Miyahara | 382/104 |
| 7,672,514 B2 * | 3/2010 | Chang et al. | 382/199 |
| 7,676,087 B2 * | 3/2010 | Dhua et al. | 382/170 |
| 7,764,808 B2 * | 7/2010 | Zhu et al. | 382/104 |

(Continued)

FOREIGN PATENT DOCUMENTS

| | | |
|---|---|---|
| CN | 1897015 | 1/2007 |
| CN | 101196979 | 6/2008 |
| TW | I245715 TW | 12/2005 |

OTHER PUBLICATIONS

Taiwanese language office action dated Jun. 25, 2012.

(Continued)

*Primary Examiner* — Matthew Bella
*Assistant Examiner* — Julian Brooks
(74) *Attorney, Agent, or Firm* — McClure, Qualey & Rodack, LLP

(57) ABSTRACT

An image detecting method and a system thereof are provided. The image detecting method includes the following steps. An original image is captured. A moving-object image of the original image is created. An edge-straight-line image of the original image is created, wherein the edge-straight-line image comprises a plurality of edge-straight-lines. Whether the original image has a mechanical moving-object image is detected according to the length, the parallelism and the gap of the part of the edge-straight-lines corresponding to the moving-object image.

14 Claims, 7 Drawing Sheets
(1 of 7 Drawing Sheet(s) Filed in Color)

(56) References Cited

U.S. PATENT DOCUMENTS

| | | | |
|---|---|---|---|
| 2005/0013486 A1* | 1/2005 | Wiedemann et al. | 382/181 |
| 2007/0098222 A1* | 5/2007 | Porter et al. | 382/103 |
| 2008/0063238 A1* | 3/2008 | Wiedemann et al. | 382/103 |

OTHER PUBLICATIONS

Lin, C.W., et al.; "Knowledge-Based Video Indexing for Road Surveillance;" ICL Technical Journal; Jun. 2008; pp. 78-83.

Kamat, V., et al.; "Hough Transform for Vehicle Identification;" Symposium on Intelligent Vehicles; Jul. 1993; pp. 230-234.

English language translation of abstract of CN 1897015, Jan. 17, 2007.

English language translation of abstract of CN 101196979, Jun. 11, 2008.

English language translation of abstract of TW I245715, Dec. 21, 2005.

* cited by examiner

IMAGE DETECTING METHOD AND SYSTEM THEREOF

This application claims the benefit of Taiwan application Serial No. 97140546, filed Oct. 22, 2008, the subject matter of which is incorporated herein by reference.

TECHNICAL FIELD

The application relates in general to an image detecting method and a system thereof.

BACKGROUND

Along with the popularity of cameras, cameras are often installed in public places, and the photos or videos shot by the camera can help the police a lot in investigating crimes.

In the past, the police had to spend a tremendous amount of time examining a large volume of data, so as to find out related clues such as the time that a vehicle appears. Moreover, the cameras installed in different places may have different specifications and functions, and the moving angles and directions of the vehicles may also be different, further adding difficulties in searching the videos. In addition to the need of searching vehicles, the need of searching other moving objects, such as airplanes landed at the apron, the airplanes parked on the apron, the luggage stationed at the airport lobby, or the spears and the lead balls thrown over the sport field may also arise.

Thus, how to develop an image detecting method and a system thereof, which quickly and correctly identify the target object has become a topic of research and development.

BRIEF SUMMARY

Embodiments of an image detecting method and a system is disclosed. Whether the moving-object image is a mechanical moving-object image is detected according to the length, the parallelism and the gap of the edge-straight-lines, hence largely increasing the speed and accuracy in the detection of images.

An exemplary embodiment of an image detecting method is provided. The image detecting method includes the following steps. An original image is captured. A moving-object image of the original image is created. An edge-straight-line image of the original image is created, wherein the edge-straight-line image comprises a plurality of edge-straight-lines. Whether the original image has a mechanical moving-object image is detected according to the length, the parallelism and the gap of the part of the edge-straight-lines corresponding to the moving-object image.

An embodiment of an image detecting system is provided. The image detecting system includes an image capturing unit, a moving-object image creating unit, an edge-straight-line image creating unit and a detecting unit. The image capturing unit is for capturing an original image. The moving-object image creating unit is for creating a moving-object image of the original image. The edge-straight-line image creating unit is for creating an edge-straight-line image of the original image, wherein the edge-straight-line image includes a plurality of edge-straight-lines. The detecting unit is for detecting whether the original image has a mechanical moving-object image according to the length, the parallelism and the gap of the part of the edge-straight-lines corresponding to the moving-object image.

It is to be understood that both the foregoing general description and the following detailed description are exemplary and explanatory only and are not restrictive of the disclosed embodiments, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
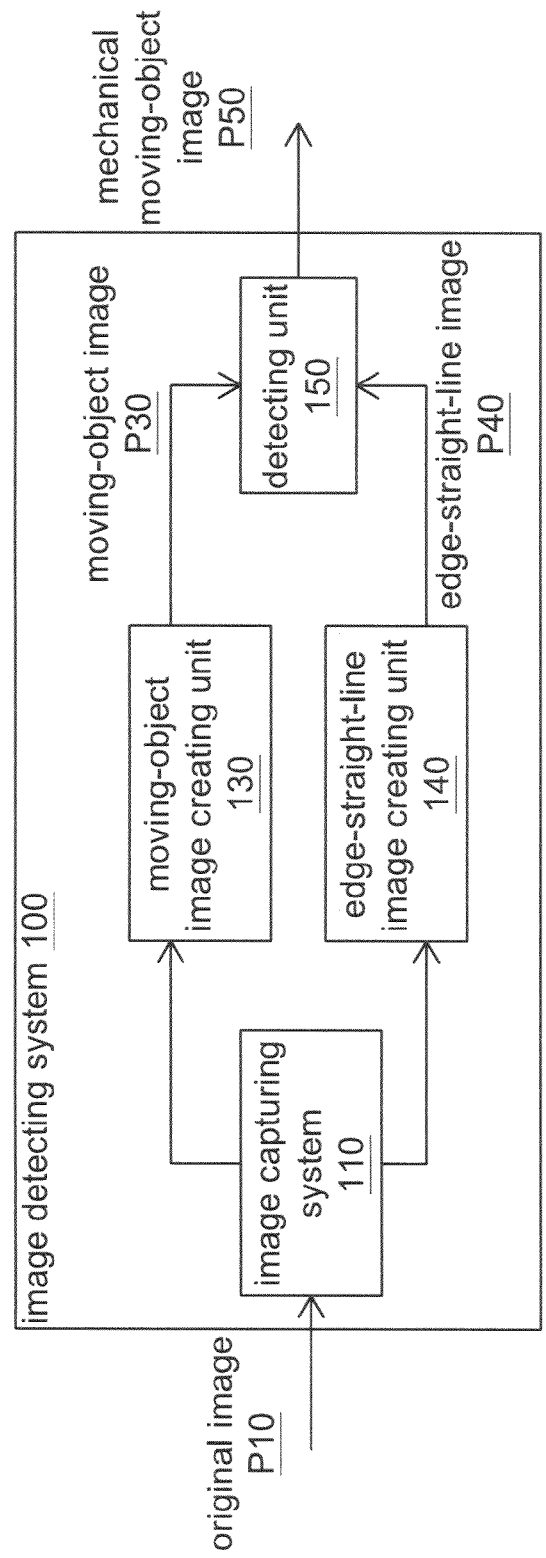
FIG. 1 shows a block diagram of an image detecting system of an exemplary embodiment.

Referring to FIG. 1, a block diagram of an image detecting system 100 of an exemplary embodiment is shown. The image detecting system 100 includes an image capturing unit 110, a moving-object image creating unit 130, an edge-straight-line image creating unit 140 and a detecting unit 150. The image capturing unit 110 is for capturing an original image P10. The image capturing unit 110 is a video recorder, a camera or a multi-media data transmission port for example. The moving-object image creating unit 130 is for creating a moving-object image P30 of the original image P10. Thus, after the original image P10 is analyzed by the moving-object image creating unit 130, which block of the original image P10 is a moving object can be easily identified. The edge-straight-line image creating unit 140 is for creating an edge-straight-line image P40 of the original image P10. Thus, after the original image P10 is analyzed by the edge-straight-line image creating unit 140, all edge-straight-lines (including moving objects and non-moving objects) of the original image P10 are clearly illustrated.

Next, the moving-object image P30 and the edge-straight-line image P40 are transmitted to the detecting unit 150, then the moving-object image P30 and the edge-straight-line image P40 are merged to form some edge-straight-lines which are corresponding to the moving object. Then, the detecting unit 150 detects whether the original image P10 has a mechanical moving-object image P50 according to the length, the parallelism and the gap of the edge-straight-lines corresponding to moving object. Examples of the mechanical moving-object image P50 include vehicles, luggage, and airplanes which have a large number of parallel straight lines but exclude pedestrians or pets which do not have a large number of parallel straight lines. The moving-object image creating unit 130, the edge-straight-line image creating unit 140 and the detecting unit 150 can be implemented by a chip, a firmware circuit or a storage medium with a plurality of programming codes. The implementations of the moving-object image creating unit 130, the edge-straight-line image creating unit 140 and the detecting unit 150 are not for limiting the scope of the disclosed embodiment.

Through the operation of the above elements, whether the original image P10 has a mechanic object P50 can be easily detected, and the disclosed embodiment can further be used in various applications. For example, during the investigation of crimes, the investigators need to search vehicle data from a large quantity of original images P10. By means of the above image detecting system 100, the episodes containing a vehicle can be quickly and easily identified. The image detecting system 100 can also be used in the statistic analysis of traffics, or the access control of a parking space. The image detecting system 100 can also be used to detect the airplanes parked on the apron, the luggage stationed at the airport lobby, or the spears and the lead balls thrown over the sport field.

The detailed components and the operation of the elements of the image detecting system 100 of the present embodiment are accompanied by a flowchart disclosed below.

Figure 2:
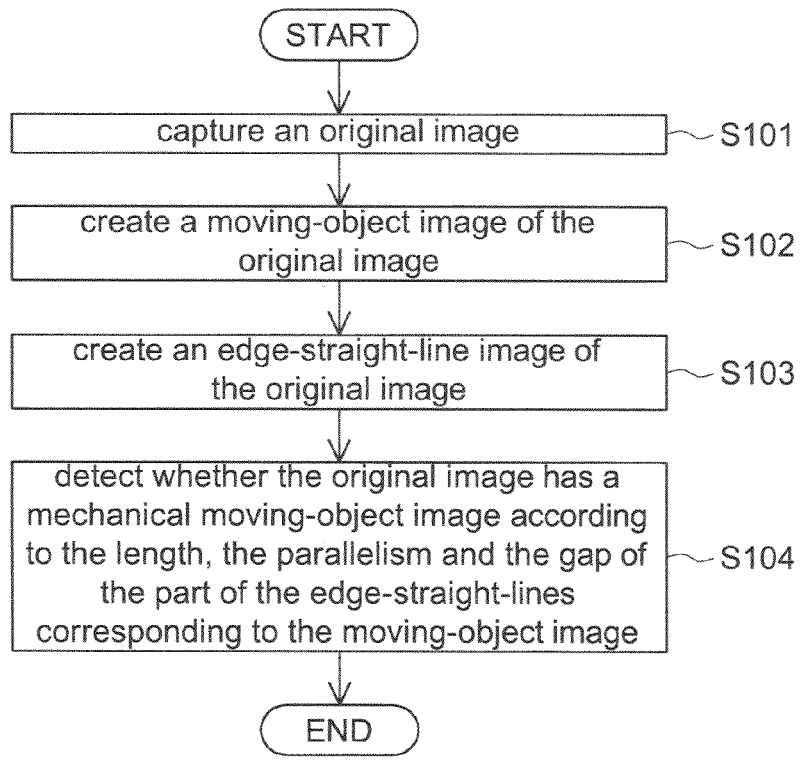
FIG. 2 shows a flowchart of an image detecting method of an exemplary embodiment.

Referring to both FIGS. 1~2. FIG. 2 shows a flowchart of an image detecting method of an exemplary embodiment. Firstly, the method begins at the step S101 of FIG. 2, an original image P10 is captured by the image capturing unit 110.

Figure 3:
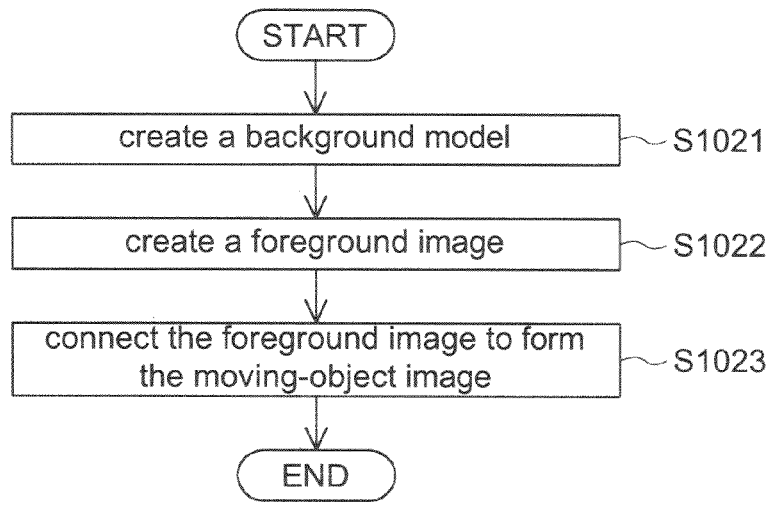
FIG. 3 shows a detailed flowchart of step S102 of FIG. 2.
Figure 4:
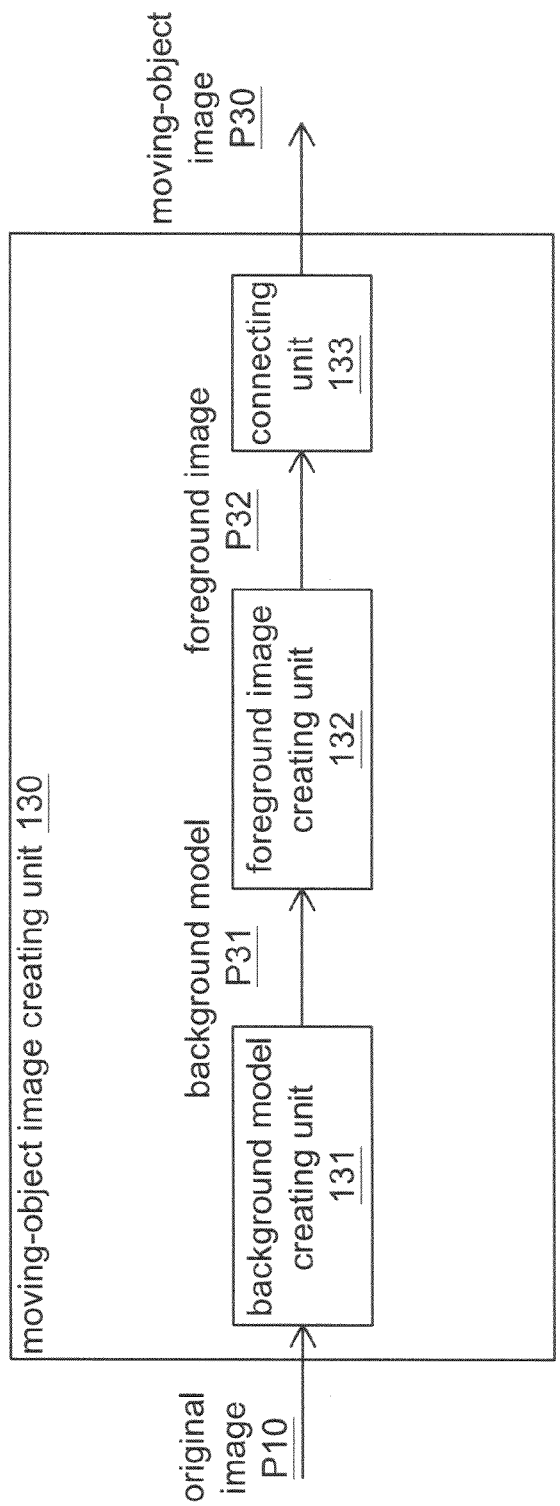
FIG. 4 shows a block diagram of the moving-object image creating unit of FIG. 1.

Next, the method proceeds to the step S102 of FIG. 2, the moving-object image P30 of the original image P10 is created by the moving-object image creating unit 130. The step S102 includes a plurality of sub-steps S1021~S1023. Referring to both FIG. 3 and FIG. 4. FIG. 3 shows a detailed flowchart of step S102 of FIG. 2. FIG. 4 shows a block diagram of the moving-object image creating unit of FIG. 1. The moving-object image creating unit 130 of the present embodiment includes a background model creating unit 131, a foreground image creating unit 132 and a connecting unit 133.

Firstly, in the step S1021 of FIG. 3, a background model P31 is created by the background model creating unit 131 according to a period of historical data. The background model P31 has much to do with the robustness and the efficiency of detection, wherein the algorithm adopted in the present embodiment is Gaussian mixture model (GMM).

Next, in the step S1022 of FIG. 3, a foreground image P32 is created by a foreground image creating unit 132 according to the original image P10 and the background model P31, wherein the foreground image creating unit 132 detects whether each pixel of the original image P10 is close to the background model P31, and the pixel is classified as the foreground image P32 if the discrepancy is too large.

Then, in the step S1023 of FIG. 3, each pixel of the foreground image P32 is connected by the connecting unit 133 to form a complete picture of the moving-object image P30 according to the pixels of the foreground image P32, and the unconnected pixels are classified as the noises to be removed.

Figure 5:
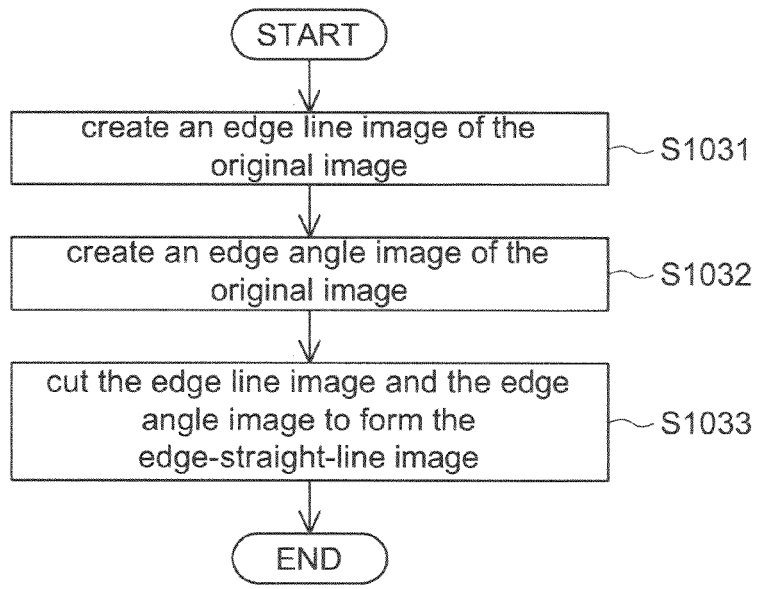
FIG. 5 shows a detailed flowchart of step S103 of FIG. 2.
Figure 6:
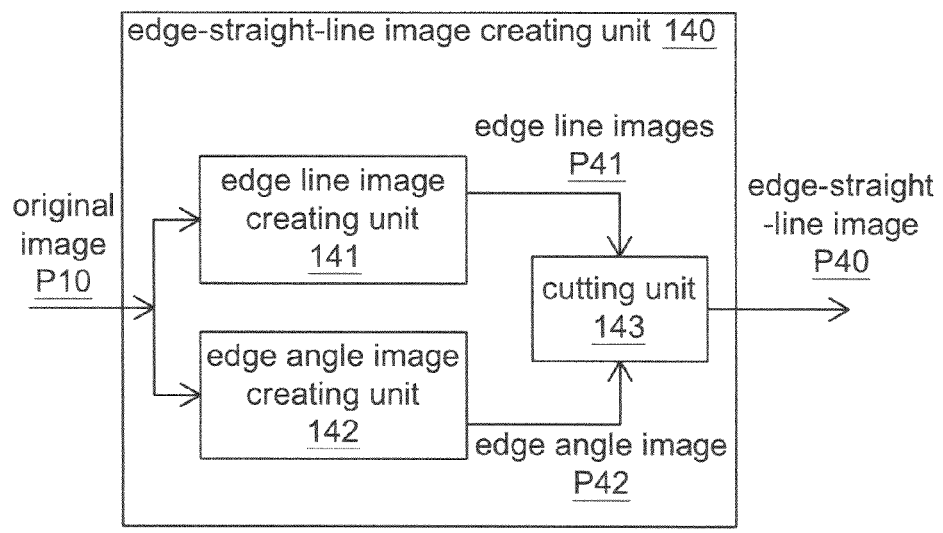
FIG. 6 shows a block diagram of an edge-straight-line image creating unit of FIG. 1.

Next, the method proceeds to the step S103, the edge-straight-line image P40 of the original image P10 is created by the edge-straight-line image creating unit 140. The step S103 includes a plurality of sub-steps S1031~S1033. Referring to both FIG. 5 and FIG. 6. FIG. 5 shows a detailed flowchart of step S103 of FIG. 2. FIG. 6 shows a block diagram of the edge-straight-line image creating unit of FIG. 1. The edge-straight-line image creating unit 140 of the present embodiment includes an edge line image creating unit 141, an edge angle image creating unit 142 and a cutting unit 143.

Firstly, in the step S1031 of FIG. 5, a plurality of edge line images P41 is created by the edge line image creating unit 141 according to the original image P10.

Next, in the step S1032 of FIG. 5, a plurality of edge angle images P42 is created by the edge angle image creating unit 142 according to the original image P10.

Then, in the step S1033 of FIG. 5, the edge line image P41 and the edge angle image P42 are cut to form an edge-straight-line image P40 by the cutting unit 143.

Figure 7:
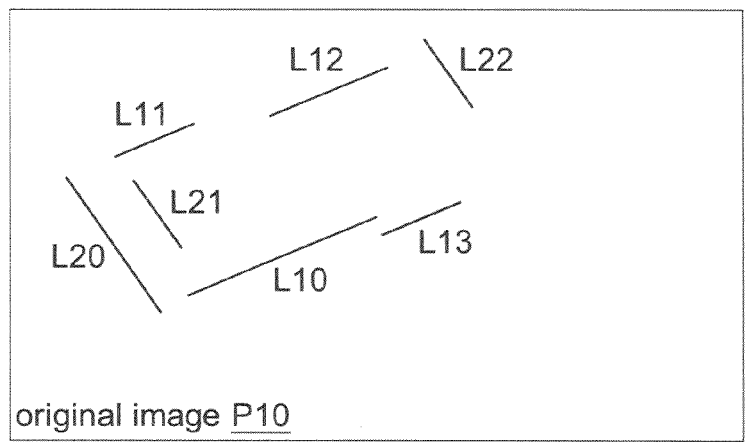
FIG. 7 shows a plurality of edge-straight-lines of a moving object.
Figure 8A:
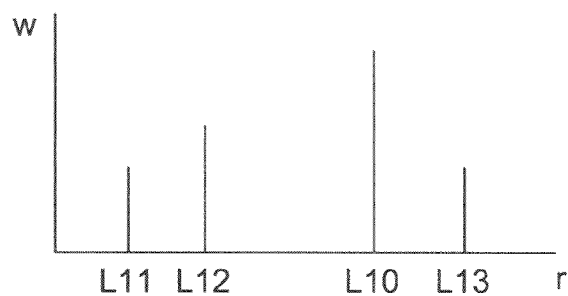
FIG. 8A shows a relationship diagram of the normal distance of edge-straight-lines L10~L13 with the normal angle θ being θ1 vs. the length.
Figure 8B:
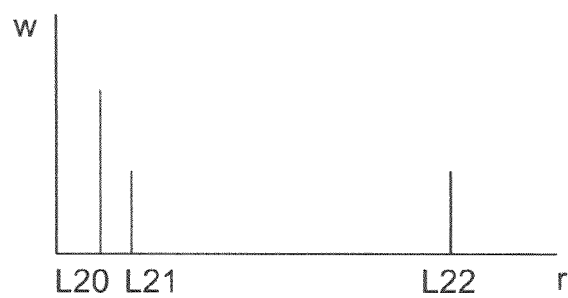
FIG. 8B shows a relationship diagram of the normal distance of edge-straight-lines L20~L22 with the normal angle θ being θ2 vs. the length.

Next, the method proceeds to the step S104, whether the original image P10 has any mechanical moving-object is detected by the detecting unit 150 according to the length, the parallelism and the gap of the edge-straight-lines corresponding to the moving object. Referring to FIG. 7, a plurality of edge-straight-lines of a moving object is shown. In FIG. 7, a moving object has edge-straight-lines L10~L13, L20~L22, wherein the edge-straight-lines L10~L13 are straight lines which are parallel to each other, and the edge-straight-line L10 is the longest line among the edge-straight-lines L10~L13. The edge-straight-lines L20~L22 are straight lines which are parallel to each other, and the edge-straight-line L20 is the longest line among the edge-straight-lines L2~L22. Each edge-straight-line can be denoted by a normal distance r, a normal angle θ and a length w. Referring to Table 1 and FIGS. 8A~8B. Table 1 shows the normal distance r, the normal angle θ and the length w of the edge-straight-lines L10~L13, L20~L22. FIG. 8A shows a relationship diagram of the normal distance r of the edge-straight-lines L10~L13 with the normal angle θ being θ1 vs. the length w. FIG. 8B s shows a relationship diagram of the normal distance r of the edge-straight-lines L20~L22 with the normal angle θ being θ2 vs. the length w.

TABLE 1

|  | i | Normal Distance r | Normal Angle θ | Length w |
| --- | --- | --- | --- | --- |
| Edge-straight-line L10 |  | $r_{\theta 1,max}$ | θ1 | $w_{\theta 1,max}$ |
| Edge-straight-line L11 | 1 | $r_{\theta 1,1}$ | θ1 | $w_{\theta 1,1}$ |
| Edge-straight-line L12 | 2 | $r_{\theta 1,2}$ | θ1 | $w_{\theta 1,2}$ |
| Edge-straight-line L13 | 3 | $r_{\theta 1,3}$ | θ1 | $w_{\theta 1,3}$ |
| Edge-straight-line L20 |  | $r_{\theta 2,max}$ | θ2 | $w_{\theta 2,max}$ |
| Edge-straight-line L21 | 1 | $r_{\theta 2,1}$ | θ2 | $w_{\theta 2,1}$ |
| Edge-straight-line L22 | 2 | $r_{\theta 2,2}$ | θ2 | $w_{\theta 2,2}$ |

In the present embodiment, the detecting unit 150 calculates the evaluation according to relative length and relative gap of the edge-straight-lines L10~L13 which are parallel to each other as well as relative length and relative gap of the edge-straight-lines L20~L23 which are parallel to each other. Through such evaluation, whether the moving object is a mechanic object with a large number of parallel lines is determined.

For example, the detecting unit 150 calculates the evaluation with a reliability function H(r,θ,w). The larger the $$\frac{w_{\theta,i}}{w_{\theta,max}}$$

is, the longer the relative length of the edge-straight-line which is parallel to the other edge-straight-lines will be. The larger the $$\frac{r_{\theta,max} - r_{\theta,i}}{r_{\theta,max}}$$

is, the wider the relative gape of the edge-straight-line which is parallel to the other edge-straight-lines will be. The sum of the product of the relative length and the relative gap of each group of the edge-straight-lines which are parallel to each other denotes the number of all edge-straight-lines which are parallel to each other as well as the level of relative length and relative gap.

Thus, according to the evaluation of the reliability function $H(r,\theta,w)$ of each moving object, the larger the evaluation of the reliability function $H(r,\theta,w)$ is, the closer to a mechanic object the moving object will be.

Figure 10:
FIG. 10 shows an original image of a complete vehicle moving towards a direction and angle.

Referring to FIG. 10, an original image P10 of a complete vehicle moving towards a direction and angle is shown. The evaluation of the reliability function $H(r,\theta,w)$ of FIG. 10 is 21.24.

Figure 11:
FIG. 11 shows an original image of a complete vehicle moving towards another direction and angle.

Referring to FIG. 11, an original image P10 of a complete vehicle moving towards another direction and angle is shown. The evaluation of the reliability function $H(r,\theta,w)$ of FIG. 11 is 15.65.

Figure 12:
FIG. 12 shows an original image of the tail of a vehicle.

Referring to FIG. 12, an original image P10 of the tail of a vehicle is shown. The evaluation of the reliability function $H(r,\theta,w)$ of FIG. 12 is 19.84.

Figure 13:
FIG. 13 shows an original image of the head of a vehicle.

Referring to FIG. 13, an original image P10 of the head of a vehicle is shown. The evaluation of the reliability function $H(r,\theta,w)$ of FIG. 13 is 13.19.

Figure 14:
FIG. 14 shows an original image of a pedestrian.

Referring to FIG. 14, an original image P10 of a pedestrian is shown. The evaluation of the reliability function $H(r,\theta,w)$ of FIG. 14 is 1.30.

As indicated in FIGS. 10-14, the evaluation of the reliability function for the vehicle is far higher than that for a pedestrian.

As indicated in FIGS. 10-11 and 14, when a vehicle moves towards different directions and different angles, the evaluation of the reliability function $H(r,\theta,w)$ for vehicle is far higher than the evaluation of the reliability function $H(r,\theta,w)$ for pedestrian.

As indicated in FIGS. 10-11 and 14, when a vehicle has different sizes in the original image P10, the evaluation of the reliability function $H(r,\theta,w)$ for vehicle is far higher than the evaluation of the reliability function $H(r,\theta,w)$ for pedestrian.

Figure 9:
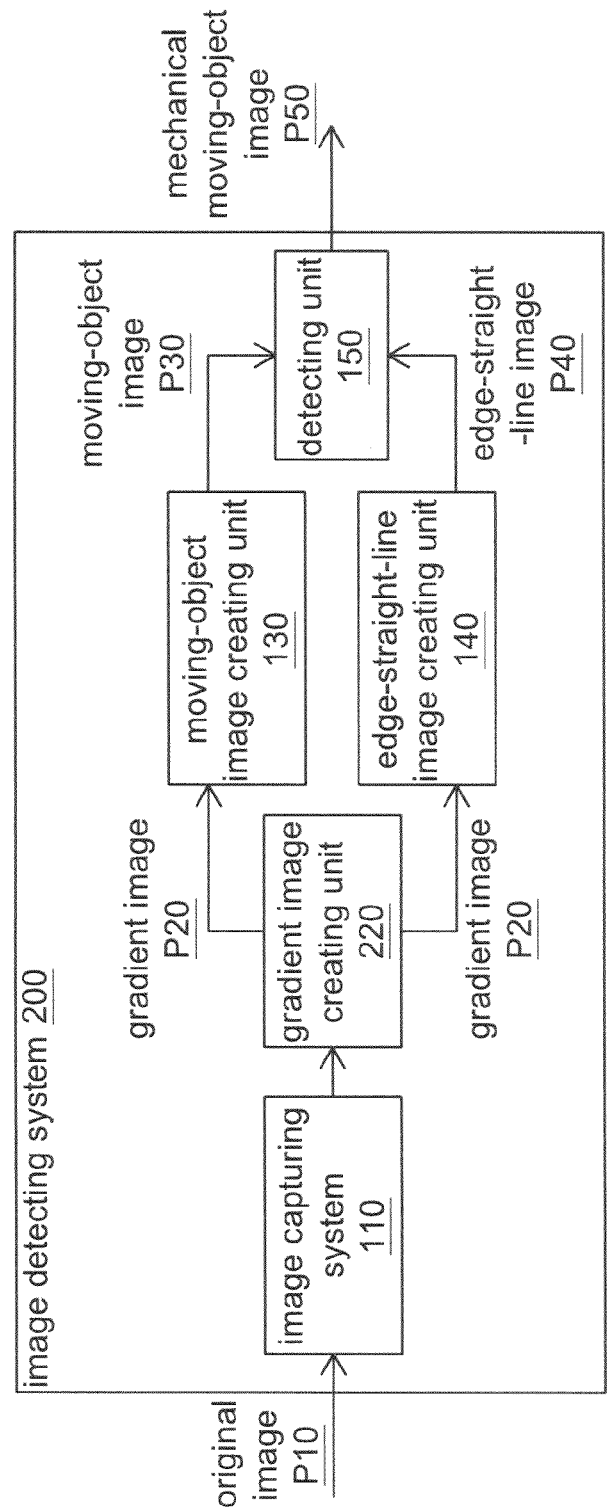
FIG. 9 shows a block diagram of an image detecting system of another exemplary embodiment.

As indicated in FIGS. 12-14, when the head or the tail of a vehicle is covered (particularly, when the head light or the tail light is covered), the evaluation of reliability function $H(r,\theta,w)$ for vehicle is far higher than the evaluation of the reliability function $H(r,\theta,w)$ for pedestrian. Referring to FIG. 9, a block diagram of an image detecting system 200 of another exemplary embodiment is shown. The image detecting system 200 of the present embodiment differs with the image detecting system 100 of the above embodiment in that the image detecting system 200 of the present embodiment further includes a gradient image creating unit 220 for creating a gradient image P20 of the original image P10, and other similarities are not repeated here.

The moving-object image creating unit 130 and edge-straight-line image creating unit 140 of the present embodiment obtain a moving-object image P30 and an edge-straight-line image P40 according to the gradient image P20. In other embodiments, the moving-object image creating unit 130 and the edge-straight-line image creating unit 140 can also adopt other information processing methods such as color information image. The present embodiment is exemplified by the analysis of a gradient image P20, but is not limited thereto.

On the part of the moving-object image creating unit 130, in order to reduce the change in light and shadow caused by the white balance of camera and sunlight, the vertical gradient value, the horizontal gradient value and the cross gradient value of the gradient image P20 are added to the Gaussian mixture model of the background model image creating unit 131 in the present embodiment.

Moreover, in the edge-straight-line image creating unit 140, the edge line creating unit 141 creates the edge line image P41 of the original image P10 according to the horizontal gradient value and the vertical gradient value of the gradient image P20. The edge angle image creating unit 142 creates the edge angle image P42 of the original image P10 according to the horizontal gradient value and the vertical gradient value of the gradient image P20.

The image detecting method and the system thereof disclosed in the above embodiments have many advantages exemplified below.

Firstly, in the above embodiments, evaluation is done according to the edge-straight-lines of each angle, so the detection is still correct even when the camera angle or the moving angle or the direction of the mechanic object changes.

Secondly, in the above embodiments, evaluation is done with respect to the edge-straight-lines, so the detection is still correct even when the head or the tail of a vehicle is covered.

Thirdly, in the above embodiments, evaluation is done with respect to the moving object, so the vehicles parked still by the side of the road are not included in the evaluation, so the still vehicles can be correctly excluded.

Fourthly, in an embodiment, after the original image is converted into a gradient image by a filter of a gradient image creating unit, radical changes in light and shade which are caused by the white balance of a camera or the environmental light can be counteracted by gradient characteristics, so the accuracy in detection is largely increased.

Fifthly, in addition to the search of vehicles, the image detecting method of the present embodiment and the system thereof can also be used to identify other mechanical moving-objects such as the airplanes parked on the apron, the luggage stationed at the airport lobby, or the spears and the lead balls thrown over the sport field.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An image detecting method, comprising:
   capturing an original image;
   creating a moving-object image of the original image;
   creating an edge-straight-line image of the original image, wherein the edge-straight-line image comprises a plurality of edge-straight-lines; and
   detecting whether the original image has a mechanical moving-object image according to the length, the parallelism and a gap of the part of the edge-straight-lines corresponding to the moving-object image;
   wherein the step of detecting comprises detecting whether the moving-object image is the mechanical moving-object according to the sum of each product of a value of a relative length and a value of a relative gap of each group of the edge-straight-lines which are parallel to each other.

2. The image detecting method according to claim 1, wherein in the step of creating the moving-object image, the moving-object image is created according to a gradient image of the original image.

3. The image detecting method according to claim 2, wherein the gradient image comprises a horizontal gradient value, a vertical gradient value and a cross gradient value.

4. The image detecting method according to claim 1, wherein the step of creating the moving-object image comprises:
    creating a background model;
    creating a foreground image; and
    connecting the foreground image to form the moving-object image.

5. The image detecting method according to claim 1, wherein in the step of creating the edge-straight-line image, the edge-straight-line image is created according to a gradient image of the original image.

6. The image detecting method according to claim 5, wherein the gradient image comprises a horizontal gradient value and a vertical gradient value.

7. The image detecting method according to claim 1, wherein the step of creating the edge-straight-line image comprises:
    creating an edge line image of the original image;
    creating an edge angle image of the original image; and
    cutting the edge line image and the edge angle image to form the edge-straight-line image.

8. An image detecting system, comprising:
    an image capturing unit for capturing an original image;
    a moving-object image creating unit for creating a moving-object image of the original image;
    an edge-straight-line image creating unit for creating an edge-straight-line image of the original image, wherein the edge-straight-line image comprises a plurality of edge-straight-lines; and
    a detecting unit for detecting whether the original image has a mechanical moving-object image according to the length, the parallelism and a gap of the part the edge-straight-lines corresponding to the moving-object image;
    wherein the detecting unit detects whether the moving-object image is the mechanical moving-object image according to the sum of a product of a value of a relative length and a value of a relative gap of each group of the edge-straight-lines which are parallel to each other.

9. The image detecting system according to claim 8, wherein the moving-object image creating unit creates the moving-object image according to a gradient image of the original image.

10. The image detecting system according to claim 9, wherein the gradient image comprises a horizontal gradient value, a vertical gradient value and a cross gradient value.

11. The image detecting system according to claim 8, wherein the moving-object image creating unit comprises:
    a background model creating unit for creating a background model;
    a foreground image creating unit for creating a foreground image; and
    a connecting unit for connecting the foreground image to form the moving-object image.

12. The image detecting system according to claim 8, wherein the edge-straight-line image creating unit creates the edge-straight-line image according to a gradient image of the original image.

13. The image detecting system according to claim 12, wherein the gradient image comprises a horizontal gradient value and a vertical gradient value.

14. The image detecting system according to claim 8, wherein the edge-straight-line image creating unit comprises:
    an edge line image creating unit for creating an edge line image of the original image;
    an edge angle image creating unit for creating an edge angle image of the original image; and
    a cutting unit for cutting the edge line image and the edge angle image to form the edge-straight-line image.

* * * * *